United States Patent [19]

Godwin

[11] Patent Number: 5,157,863
[45] Date of Patent: Oct. 27, 1992

[54] HUMANE LEGHOLD COILED SPRING TRAP

[76] Inventor: Barry G. Godwin, P.O. Box 236, Meath Park, Canada, S0G 1T0

[21] Appl. No.: 657,166

[22] Filed: Feb. 15, 1991

[30] Foreign Application Priority Data

Feb. 16, 1990 [CA] Canada .................................. 2010237

[51] Int. Cl.⁵ .............................................. A01M 23/34
[52] U.S. Cl. .......................................... 43/87; 43/185
[58] Field of Search ................................ 43/85, 86, 87

[56] References Cited

U.S. PATENT DOCUMENTS

| | | | |
|---|---|---|---|
| 2,178,256 | 10/1939 | Graybill | 43/87 |
| 2,247,066 | 6/1941 | Popp | 43/87 |
| 3,417,504 | 12/1968 | Anderson | 43/85 |
| 4,208,827 | 6/1980 | Starkey | 43/87 |
| 4,250,653 | 2/1981 | Davies | 43/87 |
| 4,286,404 | 9/1981 | Novak et al. | 43/87 |
| 4,329,805 | 5/1982 | Novak | 43/87 |
| 4,389,807 | 6/1983 | Novak | 43/87 |
| 4,513,527 | 4/1985 | Wicklund | 43/87 |
| 4,555,863 | 12/1985 | Bouffard | 43/87 |
| 4,561,207 | 12/1985 | Novak | 43/87 |
| 4,581,843 | 4/1986 | Fremont et al. | 43/87 |
| 4,735,011 | 4/1988 | Spillett | 43/86 |
| 4,757,639 | 7/1988 | Bertram | 43/85 |

FOREIGN PATENT DOCUMENTS

| | | |
|---|---|---|
| 257754 | 2/1926 | Canada . |
| 359861 | 8/1936 | Canada . |
| 378867 | 1/1939 | Canada . |
| 1117759 | 2/1982 | Canada .................................. 43/85 |
| 1145935 | 5/1983 | Canada . |
| 1219445 | 3/1987 | Canada . |

Primary Examiner—Richard K. Seidel
Assistant Examiner—Patty E. Hong
Attorney, Agent, or Firm—Robert M. Phipps

[57] ABSTRACT

The present invention relates to a new, useful and humane foot-snare trap for trapping of fur-bearing animals. More particularly the invention relates to a unique snare trap design which utilizes a vertically oriented coiled spring which, when triggered, releases vertically to cause constriction of the snare about the leg of the animal in the trap. The vertical arrangement of the coiled spring leads to an upward release of the snare which provides a means to minimize the loss of snared animals while also minimizing the discomfort or injury to the animal and damage to the animal pelt by the recoil spring action.

4 Claims, 2 Drawing Sheets

HUMANE LEGHOLD COILED SPRING TRAP

The present invention relates to new and useful improvements in foot-snare trap assemblies for live trapping of fur-bearing animals. More particularly, the invention relates to a unique snare trap design which minimizes losses of snared animals while also minimizing the discomfort of injury to the animal and damage to the animal pelt itself.

BACKGROUND OF THE INVENTION

Animal snares are known which essentially includes a snare cable having a snare loop at one end, with the end of the cable at that end having a sliding connection of some type, triggering means for activating the trap and means for anchoring the trap to the ground. Thus, if the leg of the animal becomes entrapped within the snare and the animal tries to escape, the sliding connection of the snare loop end acts in the manner of a slipknot to tighten around the animal's leg as the animal tries to move away from the trap. One initial problem with snare traps of this type is that they essentially depend on the animal's own efforts of escape as a means of tightening the snare loop. Secondarily, once trapped, the snare becomes tightly constricted about the animal's leg causing extreme discomfort to the animal and may also result in injury to the animal. This latter point is particularly undesirable if the entrapped animal is an undesirable non-target animal which would be set free by the trapper. Therefore, such snares have been considered as inhumane and undesirable for trapping an animal.

Similar criticisms have been made with respect to other types of animal traps such as the spring jaw traps, which when used causes extreme suffering and injury to the animal as well as damage to the animal's pelt.

Recently, efforts have been made to overcome these undersirable characteristics. Canadian Patent 1,145,935 to Novak, for example, discloses a snare trap which has a shock-absorbing apparatus associated with the trap. U.S. Pat. No. 4,208,827 to Starkey discloses an adjustable animal snare-type trap which includes means for permitting the trap to be adjusted so as to exert only as much pressure as may be required to hold, without hurting, the animal desired by the trapper. Similarly, U.S. Pat. No. 4,250,653 to Davies utilizes telescoping members to close the snare upon manual actuation while allowing also for selectively of target species.

Although, as exemplified above, snare-traps have been designed which provide various means to allow for adjustment of the degree of pressure exerted by the loop on the animal or animal's leg, it would be desirable to provide a humans, snare type animal trap which includes means for automatically varying the tension of the loop within prescribed limits which is a direct result of the animals'own efforts of escape as a means for determining the tension of the snare loop. It is further desirable to provide a trap that is small and light weight thereby making the trap easy to transport and easy to conceal thereby improving trapping success rates.

SUMMARY OF THE INVENTION

In a snare trap comprised of a noose formed from a snare cable which attaches to an animal when the latter springs the trap, the trap including a base member housing triggering means, the base member being affixed to the terrain, the improvement according to which there is provided means for shock-absorbing the snare cable, the means comprising a resilient member oriented vertically with respect to the terrain, the resilient member being mounted within the base member housing the triggering means, the resilient member being affixed to the snare such that when the resilient member is released upon actuation of the triggering means by the animal the resilient member expands in a generally vertical direction causing an upward movement of the snare cable and construction of the noose about the animal, the vertically oriented resilient member providing a shockabsorbing effect to the snare if the animal should attempt escape.

BRIEF DESCRIPTION OF THE DRAWINGS

The objects and features of the invention will become apparent to those skilled in the art as well as others with reference to the following description and accompanying drawings in which.

DETAILED DESCRIPTION OF THE INVENTION

Figure 1:
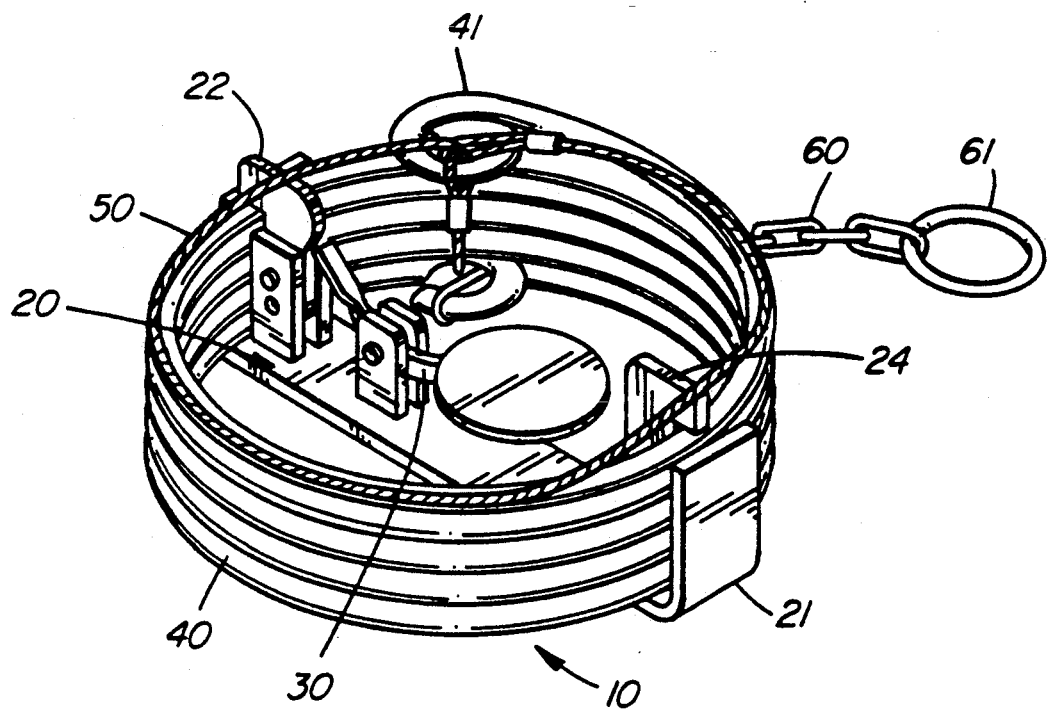
FIG. 1 is a perspective view of the trap with the coiled spring in the set position.

In a preferred embodiment of the animal trap, as shown generally in FIG. 1, the trap 10 is comprised of a base assembly 20 housing a trigger mechanism 30, a resilient member shown as a coiled spring 40 and a snare cable 50. The coiled spring 40 may be secured to the terrain by a chain 60 and ring 61. FIG. 1 illustrates the trap in the set position.

Figure 2:
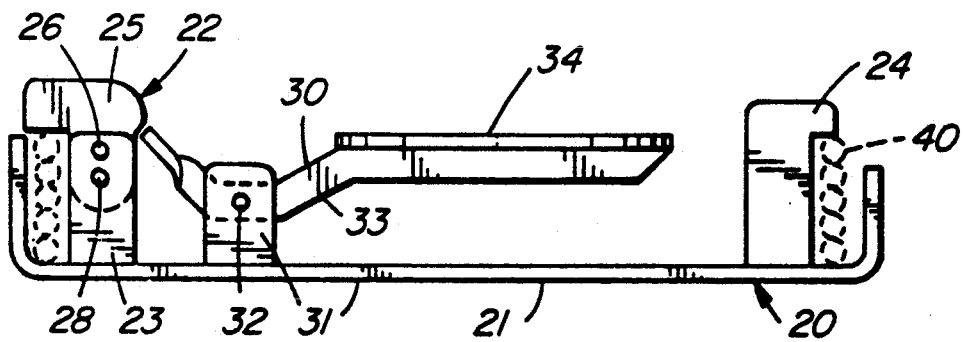
FIG. 2 is a side view of the base assembly of the trap.

The base assembly 20, is formed generally by an elongated U-shaped base member 21 having mounted thereon first and second spring retaining means shown as L-shaped brackets 22 and 24 respectively. The brackets 22 and 24 hold the coiled spring in the compressed state when the trap is in the set position as shown in FIGS. 1 and 2. The first spring retaining means 22 provides a lock and pin mechanism which is comprised of a support member 23 and a generally L-shaped lock member 25 which is pivotally connected to the support member 23 by a pair of pins 26 and 28. The lock and pin mechanism 22 coacts with a trigger mechanism 30 to release the coiled spring when this trigger mechanism is activated by the animal.

The trigger mechanism 30 is comprised of a support plate 31 vertically mounted to the base member 21. The support plate 31 via pin 32 pivotally supports a generally horizontal leg 33 to which is mounted the trigger plate or pan 34.

Figure 3:
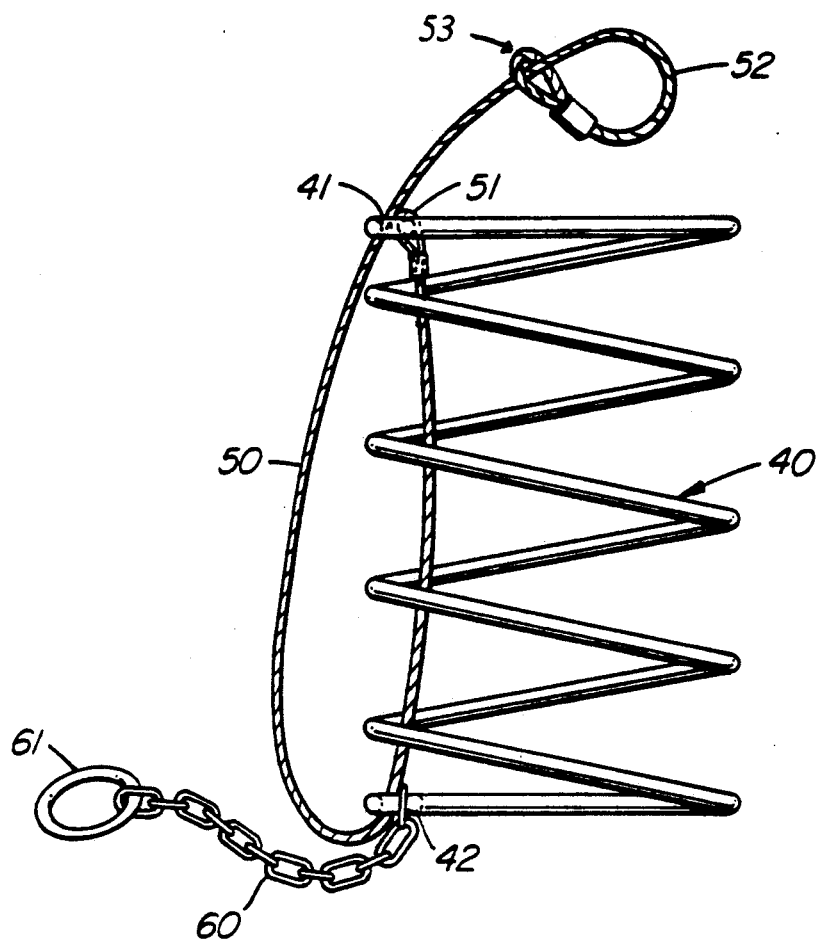
FIG. 3 is a side view of the coiled spring illustrating the orientation of the cable assembly when the trap has been triggered.
Figure 4:
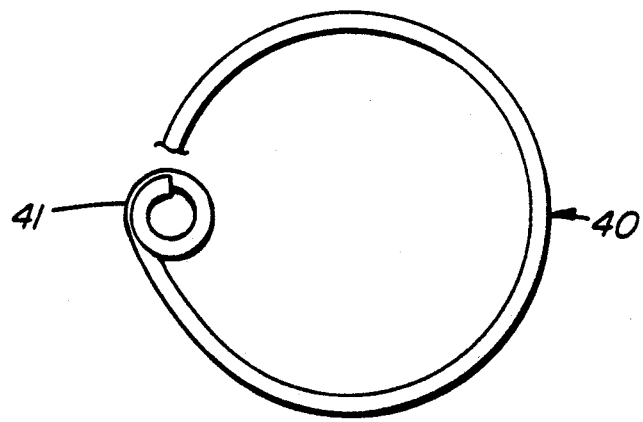
FIG. 4 is a top view of the first loop of the coiled spring.

FIG. 3 illustrates the arrangement of the snare cable 50 and the coiled spring 40 when the latter is in the sprung position. A pair of loops 41 and 42 at either end of the spring 40, as shown also in FIG. 4 provide means to affix and to guide the snare cable in the vertical direction about the spring 40. The one end of the cable 50 is secured to the first loop 41 of the spring 40 by fixed loop 51 of the cable. The cable 50 runs down the inside of the coiled spring 40 to pass through the second loop 42. The snare cable 50 then continues up the outside of the cable to pass through the first loop 41 of coiled spring 40. The cable 50 terminate with a slip noose 52 which may include a clevis 53 (as shown in FIG. 3) to allow for easy sliding along the cable. The arrangement described above allows for the noose to contract in a vertical motion about the animal's legs when the trap is triggered as a result of the movement of the coiled spring 40 in a vertical direction from the set or unsprung to sprung position without the snare cable becoming entangled.

The second loop 42 of the coiled spring 40 also provides means for anchoring or staking the trap 10 to the ground by chain 60 and ring 61. The chain 60 may be provided with a swivel (not shown) to ensure that the animal will not get tangled with the trap and chain.

It can be seen that the unique arrangement of the trap 10 as described above provides means for securing the snare noose about the animal while providing humane treatment of the trapped animal via the unique adaptation of the snare cable 50 in conjunction with the coiled spring 40 by cushioning any attempts made by the animal to get away. The vertical direction of the coiled spring 40, when released, results in the upward movement of the snare thereby improving and ensuring a more secure catch. Once the animal is caught in the trap, the coiled spring provides the desired cushioning effect whenever the animal attempts to get away. In this way, the animal is not hurt and the snare cable 50 ensures that the animal will remain caught until taken by the trapper.

It is understood that the above detailed description is directed to a preferred embodiment and one can, for example, vary the dimensions of the trap (i.e. diameter size and tension of the spring) so as to suit the size of the animal to be trapped.

Various changes may be made in the details of the invention, as disclosed, without sacrificing the advantages thereof or department from the scope of the appended claims. Furthermore, although the present invention has been disclosed and discussed with particular regard to its exceptional advantages in terms of human animal trapping, it may be understood that the invention may be employed in several applications wherein a humane trapping is desired.

I claim:

1. In a snare trap comprised of a noose formed from a snare cable which attaches to an animal when the latter springs the trap, said trap including a base member housing triggering means, said base member being affixed to the terrain, the improvement according to which there is provided means for shock-absorbing the snare cable, said means comprising a coiled spring oriented vertically with respect to the terrain, said coiled spring being mounted within said base member housing, and encircling said triggering means, said coiled spring being affixed to said snare cable such that when said coiled spring is released upon activation of the triggering means by the animal said coiled spring expands in a generally vertical direction causing an upward movement of the snare cable and constriction of the noose about the animal, said vertically oriented coiled spring providing a shock-absorbing effect to said snare cable if the animal should attempt to escape, and wherein said coiled spring includes first and second closed loops, one each at either end of the coiled spring, said first closed loop being located at the end of the coiled spring secured within the base member and which is adapted to provide anchoring means to secure the trap to the terrain; and wherein said second closed loop located at the end of the coiled spring opposite the end secured within the base member and provides a means to slidably secure the snare cable and provides means to suspend the snare cable about a side portion of the coiled spring.

2. The snare trap as claimed in claim 1 wherein said anchoring means includes a chain secured at one end to said first closed loop and the other end to the terrain.

3. A snare trap comprising a noose and means for tightening said noose, said means consisting of an elongated U-shaped base member; a coiled spring oriented vertically with respect to said base member; said spring being held in the set position at two discrete points substantially opposite one another by first and second spring retaining means mounted on a base member, said first spring retaining means also forming a lock and pin mechanism to releasably secure said coiled spring; said first spring retaining means coacting with a trip lever mounted to said base member by a support member, said trip lever including a trigger plate to provide means for releasing the coiled spring, said noose being formed of a cable, said cable having first and second ends, said first and forming a slip noose to entrap a portion of an animal when the latter springs the trap, and said second end being fixed at a point at the base of said coiled spring.

4. A snare trap comprising a noose and means for tightening said noose, said means comprising an elongated U-shaped base member, first and second L-shaped brackets mounted vertically in an inverted fashion at either end of said base member, said first L-shaped bracket also forming a look and pin mechanism; a support member vertically mounted to said base member said support member having pivotally mounted thereon a trip lever including a trigger plate; and a coiled spring oriented vertically with respect to said base member and adapted to secured within a pair of housing points when said coiled spring is in a compressed state, said housing points being formed by the ends of the base member and said first and second L-shaped brackets; said moose being formed of a cable said cable have a first end having a slip noose disposed thereon to entrap a portion of an animal when the latter springs the trap, said second end being fixed at a point on the spring and is disposed to vertically encircle a side of said spring.

* * * * *